(12) United States Patent
Ackermann et al.

(10) Patent No.: US 8,031,638 B2
(45) Date of Patent: Oct. 4, 2011

(54) METHOD AND SYSTEM FOR DETERMINING THE TOPOLOGY OF A MODULAR ANALYSIS SYSTEM

(75) Inventors: Friedrich Ackermann, Heidelberg (DE); Guido Abel, Mannheim (DE); Udo Manser, Schwetzingen (DE); Michael Schabbach, Weinheim (DE); Manfred Augstein, Mannheim (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 411 days.

(21) Appl. No.: 10/527,138

(22) PCT Filed: Sep. 13, 2003

(86) PCT No.: PCT/EP03/10205
§ 371 (c)(1),
(2), (4) Date: Mar. 8, 2005

(87) PCT Pub. No.: WO2004/028081
PCT Pub. Date: Apr. 1, 2004

(65) Prior Publication Data
US 2006/0165016 A1      Jul. 27, 2006

(30) Foreign Application Priority Data
Sep. 14, 2002 (DE) ................. 102 42 784

(51) Int. Cl.
*H04L 12/28* (2006.01)
(52) U.S. Cl. ........ 370/255; 370/257; 709/221; 709/223; 709/244
(58) Field of Classification Search ............. 340/825.52; 719/310; 303/3; 715/771; 705/14; 370/241, 370/242, 248, 254, 257, 400; 709/207, 238–239, 223, 224, 208, 211, 253
See application file for complete search history.

(56) References Cited

U.S. PATENT DOCUMENTS

| | | | |
|---|---|---|---|
| 5,204,669 A * | 4/1993 | Dorfe et al. | 340/825.52 |
| 5,404,460 A | 4/1995 | Thomsen et al. | |
| 5,628,027 A | 5/1997 | Belmont | |
| 5,737,319 A | 4/1998 | Croslin et al. | |
| 5,754,765 A * | 5/1998 | Danneels et al. | 709/222 |
| 6,216,172 B1 * | 4/2001 | Kolblin et al. | 709/253 |
| 6,330,229 B1 | 12/2001 | Jain et al. | |
| 6,347,336 B1 * | 2/2002 | Song et al. | 709/223 |
| 6,625,659 B1 * | 9/2003 | Aramizu et al. | 709/239 |
| 6,780,064 B2 | 8/2004 | Abel et al. | |
| 6,848,104 B1 * | 1/2005 | Van Ee et al. | 719/310 |
| 6,920,494 B2 * | 7/2005 | Heitman et al. | 709/223 |
| 7,027,411 B1 * | 4/2006 | Pulsipher et al. | 370/254 |
| 7,062,718 B2 * | 6/2006 | Kodosky et al. | 715/771 |
| 7,216,090 B2 * | 5/2007 | LaCroix | 705/14 |
| 2002/0046272 A1 * | 4/2002 | Ikeda | 709/223 |
| 2003/0069960 A1 * | 4/2003 | Symons et al. | 709/223 |
| 2003/0214953 A1 * | 11/2003 | El-Demerdash et al. | 370/400 |
| 2004/0012249 A1 * | 1/2004 | Koelzer | 303/3 |
| 2004/0090925 A1 * | 5/2004 | Schoeberl et al. | 370/254 |

FOREIGN PATENT DOCUMENTS
WO      WO 92/04675      3/1992

* cited by examiner

*Primary Examiner* — Kwang B Yao
*Assistant Examiner* — Jeffrey M Rutkowski
(74) *Attorney, Agent, or Firm* — Baker & Daniels LLP

(57) ABSTRACT

The invention relates to the field of modular analytical systems. The invention enables the topology of a modular analytical system to be determined without requiring additional complicated measures such as a system reset. The method/system is also adapted to industry standards such that CAN-busses can be used.

15 Claims, 3 Drawing Sheets

EXTERNAL SUPPLY OF VOLTAGE

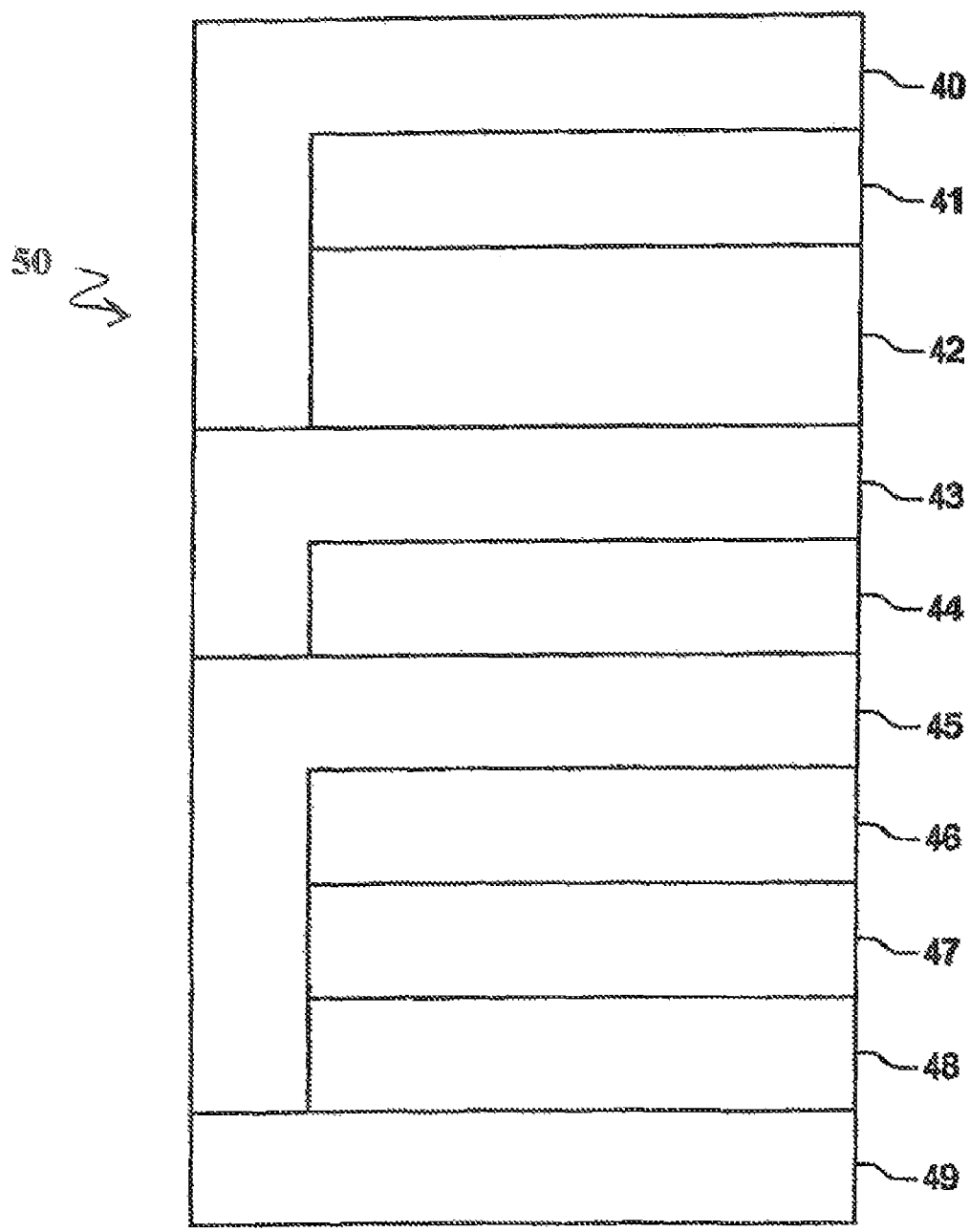

METHOD AND SYSTEM FOR DETERMINING THE TOPOLOGY OF A MODULAR ANALYSIS SYSTEM

CROSS-REFERENCE TO RELATED APPLICATION

This is a national stage application of International Patent Application No. PCT/EP2003/010205, filed Sep. 13, 2003, which claims priority to German Patent Application No. 102 42 784.4, filed Sep. 14, 2002, the disclosures of which are incorporated herein by reference.

BACKGROUND OF THE INVENTION

The present invention is directed to modular analytical systems and, more particularly, to a method and system for determining the topology of a modular analytical system.

Instrument systems which comprise a plurality of modules are frequently used for tailor-made analytical systems which are adapted to one particular field of application. Some of the areas of applications which require a tailor-made profile of requirements are for example in the field of medicine and diagnostics. Highly specialized analyzers are often used in these fields which have to meet very high specifications. As a result of the specific performance features of the analyzers, it is often not possible for one analyzer alone to cope with the large number of requirements for an analytical system. Furthermore, additional devices are often necessary apart from the analyzers which are used to process and output data.

If a modular analytical system is for example used to analyse various clinical pictures, different parameters have to be determined depending on the clinical picture resulting in different requirements for the analytical system due to the field of application. Moreover, the manufacture of specific instruments that are used in such analytical systems is complicated and expensive and, hence, one aims to utilize the instruments to the highest possible extent. As a result, an analyzer has to be designed to be used for several systems and the number and type of analytical instruments varies in a modular analytical system. Hence, it is desirable to be able in each case to easily optimize an analytical system for a field of application and assemble it from several analyzers. Thus, for example, analyzers that are not required for standard analyses can be added or removed from the analytical system as required. Hence, the flexible use of an analyzer in a system not only enables a tailor-made solution with regard to the respective field of application but also an improved utilization of instruments. This ensures that highly specialized analytical systems can be provided in a cost-optimized manner. In addition, a central control of the analytical system can avoid additional costs since, for example, elements of the user interface (screens, loudspeakers, printers, etc.) no longer have to be provided for each individual analyzer. For this a central control makes the contact between the elements and the respective module.

Several methods and systems are described in the prior art to simplify the handling of modular analytical systems for the user. They often provide methods utilizing a central control unit which allow a determination of the arrangement of the individual modules relative to the central control unit as already described. Thus, the user does not have to carry out the otherwise necessary action of visually ordering the modules and their connection with the central unit and entering this relative arrangement into the system. Especially in the case of analytical systems in which modules are frequently exchanged and are operated by different users, a visual ordering of the relative arrangement of the modules and the respective input into the control unit would be a complicated and time-consuming process. The requirements that a modern modular analytical system has to meet of being easy and flexible to handle, would be significantly impeded by a visual procedure.

A method for determining the relative arrangement of modules is described in U.S. Pat. No. 5,404,460. This document discloses a system in which several modules are connected in series such that in each case the output of a module is connected to the input of the next module. The output of the last module is connected to a serial input of a central controller. The system has a common clock and a common reset line for all modules. A system reset and subsequent central clock-pulsing enables a specific reading and writing of the serial busses at exact times. In this process the first module generates a data packet when the system resets and gives itself an address (0). This data packet is now passed in phase from the first to the last module and finally to the central controller during which each module increases the packet contents by a data packet (+1) and gives it the corresponding address. As a result, the central controller receives information on the number and sequence of the modules in the overall system. The data packet corresponding to a respective address can also be used to transmit other data to the central controller which for example include a type name of the module. Hence, a display of the sequence of modules can simplify the identification of the modules for example by means of the type name and thus simplify an allocation by the user. A major disadvantage of this method is that each address allocation can only take place by resetting the entire system. Furthermore, the system is required in each case to have a line for a system reset and a clock line. Another serious disadvantage is that the system relies on a very particular clock cycling of its serial bus. Thus, with regard to an OSI layer model which is elucidated in the following it makes provisions about a bit transfer layer of its protocol. This imposes serious constraints on the freedom of the user to use industry standard protocols since, in particular, industry standardized busses are incompatible with such a method. A widespread industrial serial bus is for example the CAN bus. These special serial busses contain small data packets and are thus particularly robust compared to conventional serial busses. In these busses information is transferred at the protocol level of the OSI layer model. However, no address can be freely selected at this level. Hence, the method cannot be used for modules that are equipped with CAN busses as a standard.

Another method for determining topologies is described in International Patent Application No. WO 02/04675. This method is similar to the already described method since a data packet with address information is passed from module to module via a serial bus. The required synchronization is achieved by a separate control line. This gives rise to the already described disadvantages of the prior art since the method is incompatible with industry standards in order to achieve a specification of the protocol. Furthermore, an additional line is necessary in this case.

SUMMARY OF THE INVENTION

It is against the above background that the present invention provides certain unobvious advantages and advancements over the prior art. In particular, the inventors have recognized a need for improvements in methods and systems for determining the topology of a modular analysis system.

Although the present invention is not limited to specific advantages or functionality, it is noted that the present invention provides a method and a system which automatically enables the topology of modules to be determined in an analytical system. In accordance with one embodiment of the present invention, the method allows the user of a modular analytical system to display the topology of the system (e.g., graphically) on a screen. A modular analytical system is understood in the sense of the present invention as a system which is composed of a plurality of devices which are directly or indirectly connected to one another. Furthermore, the term topology of an analytical system is understood within the sense of the present invention as a spatial arrangement of modules relative to one another but without any absolute geometric information content.

The method according to one embodiment of the present invention enables the user to spatially allocate modules without having to carry out complicated operating steps for this purpose. For this purpose, the user who is himself in front of the central unit when operating the system is informed about the arrangement of the modules relative to the central unit and thus relative to his own position. Hence, the user can easily recognize which modules are present in the analytical system and are in contact with the central unit. Consequently, the user rapidly gets an overview of the analytical system and can adapt it to his needs by adding or removing modules. Starting at his own position the user is for example informed that module 1, a blood sugar measuring instrument, is to his right next to the central unit. This topological information on the respective modules considerably facilitates the operation of a modular analytical system and hence the method according to the invention offers considerable advantages when operating especially complicated analytical systems, and also ensures a simple handling for many different users. The method and system according to the present invention proves to be useful especially for instrument systems which comprise a plurality of modules because especially in this case the user cannot manage without a clearly arranged handling.

In accordance with one embodiment of the present invention, a method for determining the topology of modules in a modular analytical system is provided comprising the following steps. Firstly, several modules which store data in a memory are contacted with a central unit where at least two of the modules are connected in series. In this connection it is, for example, conceivable that the modules are arranged linearly relative to the central unit. However, it is also for example possible to have a star topology with a central unit at the center. After the modules have been contacted with the central unit, the data of the modules which are directly or indirectly contacted with the central unit are transmitted to the central unit and typically registered there. Firstly, a contact between a module and the central unit is specifically interrupted. The module data are again transmitted to the central unit. The central unit now again registers all module data. The interrupted contact is subsequently re-established. The topology of the modules can be determined by comparing the registered data of the modules before and after the interruption of the contact. In this connection it is possible to interrupt the contact to another module and to repeat the corresponding process steps until comparison of the registered data before and after interruption of a particular contact yields sufficient information to calculate the topology.

In accordance with another embodiment of the present invention, a modular analytical system is provided comprising a central unit which is in contact with several modules. In this embodiment, at least two of the modules are connected in series. The modules each have a memory to store data. The analytical system additionally comprises a switch which is contacted with a computer unit and can be controlled by this unit in such a manner that contact between a module and the central unit can be interrupted and re-established. For this purpose the computer unit comprises a control unit to control the switch and a memory for registering module data. The topology of the analytical system is calculated using a computing unit. In this case the data registered before and after an interrupted contact between the central unit and the module are compared.

The present invention achieves the above-mentioned need by means of the described system using a suitable electronic circuit and an appropriate method which allows the central unit to deduce the relative arrangement of the individual modules. The system and the method are compatible with industry standards such as Controller Area Network ("CAN") busses and can thus be used without difficulty in commercial systems. As a result of the method used it is not necessary to allocate addresses by means of serial busses in which a reset of the system is required. Hence, the user can easily integrate the method in commercial systems without requiring complicated additional measures.

The system and method according to the present invention have the additional advantages of providing a modular analytical system with a high degree of flexibility so that, for example, individual modules can be removed from or added to the analytical system at any desired time. Since it is not necessary to reset the system in order to carry out the method, the method can consequently also be used while the system is operating and not only during a special initialization sequence. Hence, the system and method according to the embodiment of the present invention allow an automatic calculation of the relative arrangement of individual modules and enable it to be advantageously visualized in a suitable form for a user. Thus, it supports the requirement for example for medical devices constructed in a modular manner which aim at a plug and play operation. In this connection the term "plug and play" means among others that it is not necessary to reset the entire system after a module has been added or removed.

The data stored in a module can comprise any information and hence the method is not limited to any type of data or information. The data typically contain information which allows an identification of a module, e.g., a glucose measuring instrument.

Furthermore, a variety of methods are conceivable within the sense of the present invention which influence data transfer between module and central unit. For example, this may involve interrupting the power supply or a communication route to a module such that the module or the communication unit of a module is no longer in operation. Data can then only be transmitted to the central unit via modules which still have an active communication unit. Thus, for example, in the case of modules connected in series, all modules that are connected in series and are on the other side of the module whose contact was interrupted, taking the central unit as the starting point, would no longer be in communication with the central unit. It is, however, also conceivable that in the described example all modules on the other side of the interrupted contact are still activated and able to communicate with the central unit. In order to identify the modules that are contacted on the other side of the interrupted contact and distinguish them from the other modules, additional data are for example generated when the contact is interrupted which identifies the modules in the further course of the process. The generated data which are advantageously stored in the respective module can then be used by the central unit when it communicates with the module to detect that the module is on the other side of the interrupted contact when taking the central unit as the starting point.

Consequently, in the sense of the present invention, the contact between module and central unit is interrupted in such a manner that it is possible to differentiate between the modules which, taking the central unit as a starting point, are connected in series on the other side of the interrupted contact and the remaining modules.

As described, this can for example be achieved by deactivating the power supply or a communication route or, for example, by generating additional data that are used to identify the modules. In this connection it is irrelevant for the invention whether the modules connected in series that are on the other side of the interrupted contact or on the side of the interrupted contact facing the central unit are identified or deactivated.

These and other features and advantages of the present invention will be more fully understood from the following detailed description of the invention taken together with the accompanying claims. It is noted that the scope of the claims is defined by the recitations therein and not only by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which:

FIG. 3 is a schematic diagram of a communication protocol (structogram) in accordance with one embodiment of the present invention.

Figure 1:
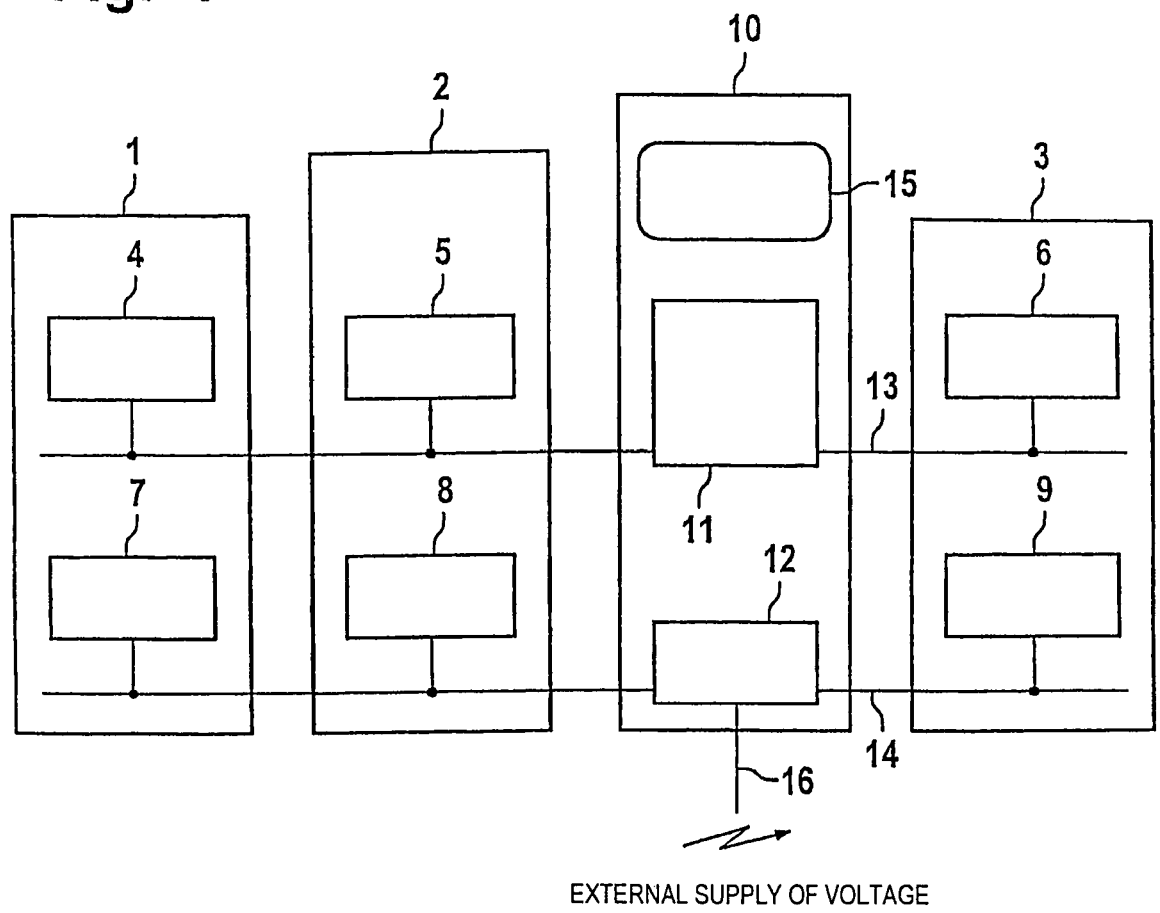
FIG. 1 is a schematic diagram of a modular analytical system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiment(s) of the present invention.

DETAILED DESCRIPTION OF THE INVENTION

A communication protocol that is realized in the electronics and software is defined in the system. This communication protocol enables the central unit to exchange commands and data with each module. The modules and central unit are addressed by means of logical addresses $A_i$. Since there is only a finite number of such addresses in the system, the central unit is able to iterate over all addresses. In this connection each module $M_i$ has an identification $I_i$. This identification can contain a variety of information. It may, for example, prove to be sufficient that a module is identified by its type name. Such an identification could then for example be called blood sugar or coagulation measuring instrument, etc. If several instruments of the same type are present in an analytical system, additional identification features are necessary to exactly identify an instrument. In principle, a wide variety of methods are conceivable for data transfer which can be used to identify a module. The data may enable a direct or indirect identification of the module. In this case, it is for example conceivable that the transferred data allow a module to be identified by means of a program of the central unit. Hence, in accordance with the present invention, the term identification of a module includes those data from which a determination of a module can be directly or indirectly derived. The identification data of a module are stored in a permanent memory of the module such that the information on the identification of a module is also still present in the module memory even after an interruption of the power supply.

Communication and power supply of the modular system can be ensured by lines to the module starting from the central unit. It is, however, also conceivable that either only the communication or only the power supply is via lines. If only the communication is via lines, the power supply can for example be accomplished by means of connections to each of the individual modules. If in contrast the power supply is line-bound via the central unit, a wireless communication with the modules is also conceivable. This can, for example, be achieved by infrared sender and receiver systems. The individual modules can then exchange information with one another as well as with the central unit advantageously in a wireless manner.

Due to the fact that the communication or power supply are line-bound, the method allows the topology of the system to be determined particularly simply in a typical embodiment. In this case at least some of the modules are connected in series. In this connection it is, for example, conceivable that the modules are arranged linearly relative to the central unit. However, it is also for example possible to have a star topology a central unit at the center. As a consequence, when a contact between a module and the central unit is interrupted, all modules which from the viewpoint of the central unit are on the other side of the interruption point, are disconnected from the central unit. Hence, the interruption can be achieved by interrupting the power supply and/or the communication line. It is of course also possible to use line-bound means to contact the modules if it proves to be appropriate. Under these circumstances the power supply as well as the communication is line-bound. However, care should be taken that at least some of the modules are connected in series by suitable means in such a manner that this enables a predetermination of the modules relative to one another.

After the analytical system has been switched on, all modules are initially active and ready for communication. The central unit checks whether all addresses that are known to and specified in the system are actually present in the analytical system. Hence, the central unit registers the absolute number of modules that are present in an analytical system since the user may have removed or added modules while the analytical system is switched off. Thus, the central unit has a register of all modules present in the analytical system at the present time as well as their identification and optionally other information that are transferred with the identification. The central unit then gives the command to the module $M_i$ to interrupt the contact beyond module $M_i$ in the chain such that, for example, the power supply is interrupted from module $M_i$ onwards. The central unit subsequently interrogates all modules that are in contact with the central unit. The modules that are still in contact with the central unit after interruption of the contact are again registered. Module $M_i$ to which the power supply was interrupted is no longer in operation at this time and thus it can no longer communicate with the central unit. All modules that were in contact with the central unit via module $M_i$ are also de-activated. However, if for example all modules are still present in the system apart from the module to which contact has been interrupted, then this module must be an end module. In accordance with the present invention, the term end module is understood as a module which is only in direct contact with one other device (module or central unit). Hence, this registration enables the central unit to directly calculate the relative arrangement of the module $M_i$ in the analytical system. Subsequently, contact is restored to all modules.

If more than two modules are contacted with the central unit in the quoted example, it is still not possible to unequivocally determine the relative arrangement of the second module. In order to further determine the topology, contact to one of the other modules is again interrupted and again the modules present in the system are registered. If it is, for example, not possible to contact the other modules after this contact is interrupted, this module is an initial module and the other modules are connected in series on the other side of this module.

It turns out that the method has a linear complexity which means that the number of steps required is proportional to the number of modules that are present in order to completely calculate a relative arrangement of the modules in the system.

The method is carried out by carrying out the communication protocol exclusively at the level of the session and application protocol. This means that in the sense of an OSI layer model an application is only carried out in the upper layers. The OSI layer model describes a protocol on the following seven levels in which the lowest level is referred to as level 1.

The first level is a bit transfer layer which determines how "crude" bits are transferred. On this level electrical and physical properties such as cable lengths, resistances, pin allocations and frequencies are determined.

On the second level crude bits are converted into data, e.g., by building up data packets. This second level is also referred to a securing layer.

Furthermore, a network layer is used for control and a transport layer is used to split up large amounts of data into individual data packets and to identify data packets and to handle errors when data packets are not correctly received.

The fifth level is referred to as a session level and defines how a communication is set up, carried out and ended.

The data are then presented and interpreted in the presentation layer before the functionality and control of the applications that are utilized by the protocol are defined in the application layer.

According to the OSI layer model described above, the method is exclusively carried out at levels 5 (session layer) to 7 (application layer). No requirements are made for levels 1-4.

In contrast, a transfer has to be carried out down to the lowest level of the seven layer OSI layer model (bit transfer layer) in order to carry out the methods described in the prior art. Hence, in contrast to the methods described in the prior art, the method according to the present invention can be combined as desired with conventional industry standardized protocol types, in particular, the CAN bus or TCP-IP which are well-known in the prior art and are described for example in "Grundlagen der Vernetzung" and "Medizintechnik, Verfahren, Systeme und Informations-verarbeitung", Berlin, among others: Springer 1997 (p. 601 ff). If at least some of the modules are connected in series in such a manner that the arrangement of the modules relative to one another can be predetermined and if the communication or power supply is line-bound, the method or system according to the invention can be easily applied without making further demands on the system.

In order that the invention may be more readily understood, reference is made to the following examples, which are intended to illustrate the invention, but not limit the scope thereof.

FIG. 1 shows an analytical system in accordance with one embodiment of the present invention, which has a central unit (10) to which three modules (1, 2, 3) are connected in series. All three modules have a communication unit (4, 5, 6) and a power supply (7, 8, 9). The communication units and power supply are connected via a line (13, 14) to the communication unit (11) and the power supply (12) of the central unit. The power supply (12) is connected to an external power supply via a lead (16). The line-bound connection (13) between the communication units enables the respective modules to exchange information or to forward information directly to the communication unit in which data are processed. Thus, it is for example possible to coordinate analytical processes. If the analyzers are advantageously connected by a plug connection as is known in the prior art from the document (DE 10134885.1), analytical processes can be successively coordinated in an advantageous manner. In this case the plug connection contains lines which allow a sample exchange between the individual modules. Thus, the communication unit can for example be used for module (1) to communicate the end of an analysis to module (2). The sample used in module (1) is then passed on to module (2) while module (2) receives the command to start an analysis via the communication unit. Such a connection of modules saves the user from having to carry out numerous operating steps. After a single sample application several analytical methods are carried out successively by the available modules. After each analytical method is completed, the analytical results can be directly displayed to the user on a screen (15) of the central unit. It is, however, also possible that the results are automatically processed by the central unit. A wide variety of possibilities are conceivable for the data processing which simplifies the data processing for the user by comfortable menus. A module for determining the blood gas concentration, the coagulability of blood, blood glucose or for determining proteins as markers of cardiac infarction, are for example suitable in such an analytical system.

If samples are not exchanged between modules, module (1) for example comprises a measuring instrument for determining blood glucose and module (2) comprises an instrument for measuring cartridges for determining the coagulability of blood. Module (3) has a blood gas analyzer. In this analytical system described as an example the blood must then be separately applied either onto strips or cartridges. The test elements are either inserted into the respective measuring instrument or taken up by a special Zangen syringe. In this connection it is also conceivable that the measuring instruments automatically evaluate the raw values and process them into a laboratory result. The processed results are communicated to the central unit and displayed to the user on the screen (15) in context.

Figure 2:
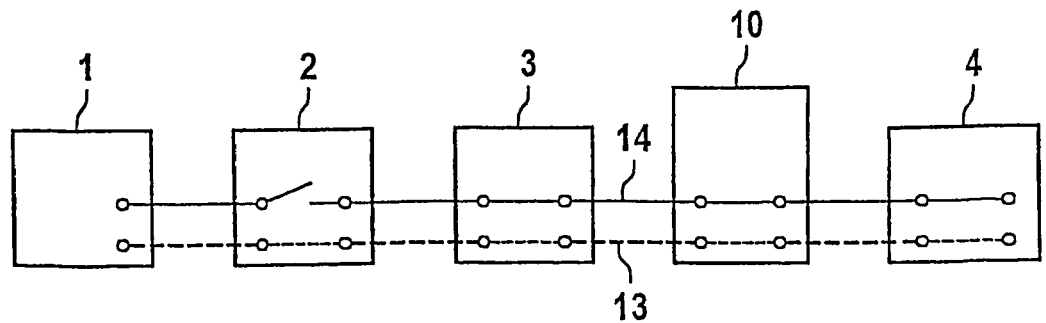
FIG. 2 is a schematic diagram of the contacting of modules with the central unit in accordance with one embodiment of the present invention.

As shown in FIG. 2 the contact between the central unit and a module is actively interrupted in order to determine the topology of an analytical system. As shown in FIG. 2 the entire system consists of four modules (1 to 4). These modules are also in contact with the power supply of the central unit via lines as already shown in FIG. 1. Communication between the modules and with the central unit takes place via the communication route shown as a dashed line in FIG. 2. This can take place via lines as well as for example by means of an infrared sender or other wireless communication unit. As shown in FIG. 2 the power supply to module (1) is interrupted by module (2) by active electronics. For this purpose a switch in the power supply lead in module (2) is opened. As a result the central unit can still communicate only with modules (2) to (4) since module (1) is deactivated. Due to the fact that only module (1) can no longer be registered by the central unit, the position of module (1) relative to the central unit can be deduced which in the example shown is an end module. This applies similarly when the power supply to module (4) is interrupted since module (4) is also an end module. Communication with modules (1) to (3) is still possible even after deactivation of module (4). In contrast an interruption of the power supply to module (1) by a switch in module (3) would deactivate module (2) as well as module (1) so that from this the central unit receives the information that module (2) and module (1) must be connected in series on the other side of module (3). Hence, as a result of the described method sufficient information are sent to the central unit for determining the topology of the analytical system shown in FIG. 2. It turns out that by interrupting and restoring three contacts it is possible to determine the topology of the four modules.

FIG. 3 again illustrates the individual steps of the communication protocol (50) that are suitable for determining the topology of the analytical system. If the analytical system is activated by the user, the central unit (1) firstly has information about which possible modules can be maximally present in an analytical system. Since the number of modules that are present varies depending on needs and the user, the central unit firstly makes a query (41) in the loop (40) in order to initially determine the modules that are actually present in the system but without taking into account the topology. In this process the respective address $A_i$ of a module is checked by the query (41) to determine whether it is present in the system. The modules that are actually present respond in step (42) so that the address $A_i$ of the respective module is registered. The queries of loop (40) are repeated until all maximum possible addresses $A_i$ have been checked. In the following loop (43) all actually present modules are queried with regard to their identification $I_i$ (step 44) in order to for example enable a characterization of an analytical system as a blood sugar measuring instrument, Now the central unit knows all modules $M_i$ that are actually present, their addresses $A_i$ and their identification $I_i$. In order to determine the topology of the individual modules an iteration is performed over all addresses of the modules in a second large loop (45). The central unit commands each of the modules in step (46) to interrupt the connection to their contacted module on their side facing away from the central unit. The central unit then determines which modules can still be addressed by means of a query (47) and compares the registered identifications before and after interruption of a contact. On the basis of these data the central and can successively determine the relative spatial position of all modules that are present in step (48).

If the central unit is for example in the middle of a modular system that is connected in series, the central unit finally allocates which branch is to its left or right in step (49).

Figure 4A:
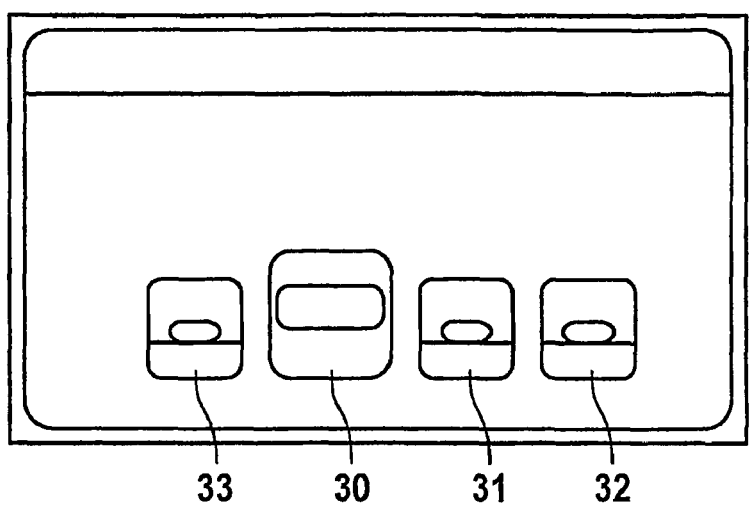
FIG. 4 shows a screen display after calculating the topology of an analytical system for the user in accordance with one embodiment of the present invention.
Figure 4B:
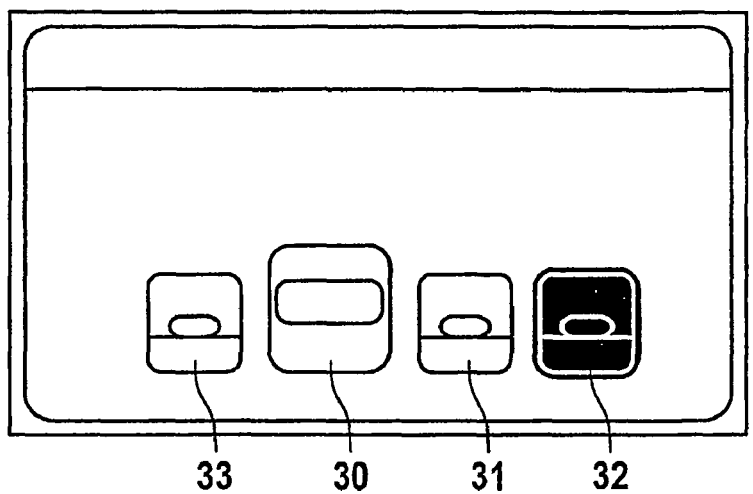
Figure 4C:
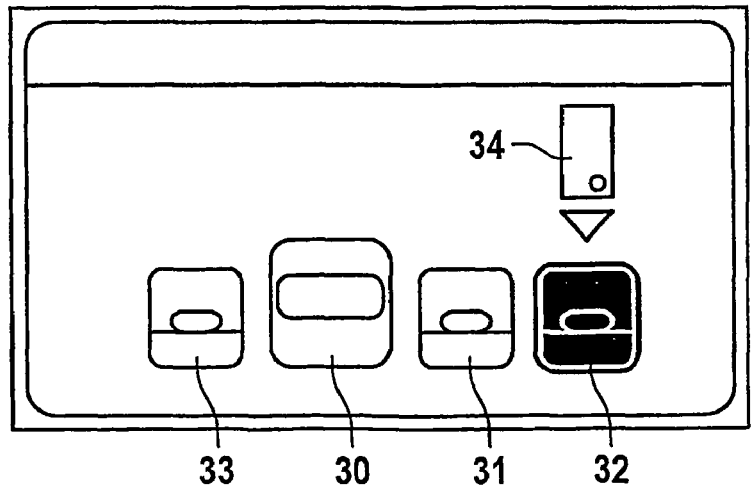

FIG. 4 shows an example of a possible screen display which illustrates the calculated topology of the analytical system to the user. FIG. 4a shows the user the position of the individual analyzers relative to the central unit (30) in front of which the user is located. Hence, the user knows that a blood gas analyzer (31) is located on his right-hand side and that a coagulation measuring instrument (32) is located on the other side of this analyzer. A blood sugar measuring instrument (33) is on the left-hand side of the central unit. Hence, this makes it considerably simple for the user to handle the system and enables a rapid operation. Other additional applications are shown as examples in FIGS. 4b and 4c which can easily be integrated on the basis of the method or system according to the present invention. Thus, it is for example possible to give the users instructions on the operation of the analytical system by means of the central unit where the instrument to be operated is directly pointed out. In FIG. 4b it is indicated to the user that a measurement is being carried out in the analyzer by the coloured accentuation or by a blinking of a module (32). Hence, the user is not only informed about the topology of the modules but also about the status of the modules at the time. FIG. 4c also illustrates a prompt to the user. In this case the user is prompted to carry out a further action by an arrow (34). Such operating instructions can of course also be in the form of a written or acoustic message. In the example shown the user is instructed to remove or insert a sample after a measurement is completed.

Hence the system enables a simple operation even for untrained users. The system and method according to the invention are especially suitable for analytical systems in which different analyzers are often used by different users since the topology is determined particularly simply without requiring a reset of the system.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method for determining the topology of modules in a modular analytical system comprising:
   a) contacting several modules with a central unit, wherein each module stores module identification information in a memory, and at least two modules are connected in series,
   b) transmitting the stored module identification information of the modules that are directly or indirectly contacted with the central unit to the central unit,
   c) interrupting a contact of a module to the central unit upon receiving a command from the central unit,
   d) transmitting the stored module identification information of the modules to the central unit,
   e) restoring the interrupted contact, and
   f) comparing the module identification information that were transmitted before the contact was interrupted with the module identification information that were transmitted after interruption of the contact and determining the topology of the modular analytical system on the basis of the comparison, wherein the method steps c to e are repeated with at least one other module until sufficient information is available from the comparison to calculate the topology.

2. The method of claim 1, wherein the module identification information is stored in a permanent memory.

3. The method of claim 1, wherein the contacting between several modules and the central unit has a star-shaped topology and the central unit can discriminate between the arms of the star by specifically interrupting the contacts to the individual arms.

4. The method of claim 1, wherein the contacting between a module and the central unit has a linear topology.

5. The method of claim 1, wherein the contact between a module and the central unit is interrupted or restored by interrupting or restoring a communication line.

6. The method of claim 1, wherein the contact between a module and the central unit is interrupted or restored by interrupting or restoring the power supply.

7. The method of claim 1, wherein the topology of the analytical system is displayed graphically on a screen.

8. The method of claim 7, wherein operating instructions are communicated to the user which on the screen are graphically allocated to a module.

9. A modular analytical system comprising:
a central unit which is contacted with several modules, wherein at least two of the modules are connected in series and the modules each comprise a memory to store module identification information,
a switch which can be controlled by a computer unit in such a manner that the contact of a module to the central unit is interrupted and restored again, wherein the computer unit comprises
a control unit to control the switch,
a memory to register the module identification information of the modules, and
a computing unit to calculate a topology of the analytical system as defined by the several modules after the contact has been interrupted and restored again on the basis of a comparison of module identification information that was registered before interrupting the contact with module identification information that was registered while the contact was interrupted;
wherein a contact is interrupted, module identification information is transmitted to the central unit, and the contact is restored for at least one other module until sufficient information is available from the comparison to calculate the topology.

10. The modular analytical system of claim 9 further comprising a CAN-bus.

11. The modular analytical system of claim 9, wherein a TCP/IP is used as the protocol.

12. The modular analytical system of claim 9, wherein the module identification information comprises a type name to identify a module.

13. The modular analytical system of claim 9, wherein the contact between a module and the central unit is via a line.

14. The modular analytical system of claim 13, wherein the modules are supplied with power from the central unit via a line.

15. The modular analytical system of claim 13, wherein the communication between a module and the central unit is via a line.

* * * * *